(12) United States Patent
Walter et al.

(10) Patent No.: US 8,837,774 B2
(45) Date of Patent: Sep. 16, 2014

(54) INVERSE STEREO IMAGE MATCHING FOR CHANGE DETECTION

(75) Inventors: Michael Walter, Vienna, VA (US); Bingcai Zhang, San Diego, CA (US)

(73) Assignee: BAE Systems Information Solutions Inc., Arlington, VA (US)

( * ) Notice: Subject to any disclaimer, the term of this patent is extended or adjusted under 35 U.S.C. 154(b) by 183 days.

(21) Appl. No.: 13/383,227

(22) PCT Filed: May 4, 2011

(86) PCT No.: PCT/US2011/035119
§ 371 (c)(1),
(2), (4) Date: Jan. 10, 2012

(87) PCT Pub. No.: WO2011/140178
PCT Pub. Date: Nov. 10, 2011

(65) Prior Publication Data
US 2012/0263373 A1    Oct. 18, 2012

Related U.S. Application Data

(60) Provisional application No. 61/331,048, filed on May 4, 2010.

(51) Int. Cl.
*G06K 9/00* (2006.01)
*G06K 9/36* (2006.01)
*G06T 5/00* (2006.01)
*G06T 7/00* (2006.01)

(52) U.S. Cl.
CPC ..... *G06T 7/0075* (2013.01); *G06T 2207/10032* (2013.01); *G06T 2207/30181* (2013.01); *G06T 5/005* (2013.01); *G06T 2207/10012* (2013.01)
USPC ............................ 382/103; 382/154; 382/285

(58) Field of Classification Search
CPC .......... G06T 2207/10012; G06T 2207/10021; G06T 2207/10032–2207/10044; G06T 7/0065; G06T 7/0075
See application file for complete search history.

(56) References Cited

U.S. PATENT DOCUMENTS 5,926,581 A * 7/1999 Pritt .............................. 382/294
6,252,974 B1 * 6/2001 Martens et al. ............... 382/107
(Continued)

OTHER PUBLICATIONS

Egnal, Geoffrey, Max Mintz, and Richard P. Wildes. "A stereo confidence metric using single view imagery with comparison to five alternative approaches." Image and vision computing 22.12 (2004): 943-957.*

(Continued)

*Primary Examiner* — Stephen R Koziol
*Assistant Examiner* — Sean Conner
(74) *Attorney, Agent, or Firm* — Sand & Sebolt; Daniel J. Long

(57) ABSTRACT

A system and method for finding real terrain matches in a stereo image pair is presented. A method for finding differences of underlying terrain between a first stereo image and a second stereo image includes performing epipolar rectification on a stereo image pair to produce rectified image data. The method performs a hybrid stereo image matching on the rectified image data to produce image matching data. A digital surface model (DSM) is generated based on the image matching data. Next, the method identifies areas in the DSM where the stereo image matching should fail based on the image matching data and the DSM to generate predicted failures. The method can then determine real terrain changes based on the predicted failures and the image matching data.

20 Claims, 5 Drawing Sheets

(56) References Cited

U.S. PATENT DOCUMENTS

| | | | |
|---|---|---|---|
| 6,714,672 B1* | 3/2004 | Berestov et al. | 382/154 |
| 6,865,289 B1* | 3/2005 | Berestov | 382/154 |
| 6,963,662 B1* | 11/2005 | LeClerc et al. | 382/154 |
| 7,630,797 B2* | 12/2009 | Garceau et al. | 701/3 |
| 8,116,530 B2* | 2/2012 | Miyazaki | 382/106 |
| 8,300,085 B2* | 10/2012 | Yang et al. | 348/42 |
| 8,462,992 B2* | 6/2013 | Chen et al. | 382/113 |
| 2001/0043738 A1* | 11/2001 | Sawhney et al. | 382/154 |
| 2003/0039389 A1* | 2/2003 | Jones et al. | 382/154 |
| 2003/0190072 A1* | 10/2003 | Adkins et al. | 382/154 |
| 2003/0198378 A1* | 10/2003 | Ng | 382/154 |
| 2004/0240725 A1* | 12/2004 | Xu et al. | 382/154 |
| 2004/0247174 A1* | 12/2004 | Lyons et al. | 382/154 |
| 2005/0074162 A1* | 4/2005 | Tu et al. | 382/154 |
| 2006/0215935 A1 | 9/2006 | Oldroyd | |
| 2006/0228019 A1* | 10/2006 | Rahmes et al. | 382/154 |
| 2006/0239537 A1* | 10/2006 | Shragai et al. | 382/154 |
| 2007/0183653 A1* | 8/2007 | Medioni et al. | 382/154 |
| 2009/0067705 A1* | 3/2009 | Yu et al. | 382/154 |
| 2009/0105948 A1* | 4/2009 | Chang | 701/209 |
| 2009/0310867 A1* | 12/2009 | Matei et al. | 382/195 |
| 2009/0324059 A1* | 12/2009 | Boughorbel | 382/154 |
| 2010/0007549 A1* | 1/2010 | Smith | 342/25 A |
| 2010/0020178 A1 | 1/2010 | Kleihorst | |
| 2010/0150431 A1* | 6/2010 | Chen et al. | 382/154 |
| 2010/0184008 A1* | 7/2010 | Fergus et al. | 434/150 |
| 2011/0064298 A1* | 3/2011 | Schlosser et al. | 382/154 |
| 2011/0128353 A1* | 6/2011 | Leung et al. | 348/47 |
| 2011/0222781 A1* | 9/2011 | Nguyen et al. | 382/218 |

OTHER PUBLICATIONS

BAE Systems. "Next-Generation Automatic Terrain Extraction (NGATE)." Published May 2007.*

Habib, A.; Chang Y.; Lee, D. Occlusion-based methodology for the classification of LiDAR data. Photogram. Eng. Rem. S. 2009, 75, 703-712.*

Megyesi, Zoltán, and Dmitry Chetverikov. "Affine propagation for surface reconstruction in wide baseline stereo." Pattern Recognition, 2004. ICPR 2004. Proceedings of the 17th International Conference on. vol. 4. IEEE, 2004.*

Richter, Rudolf. "Correction of satellite imagery over mountainous terrain." Applied Optics 37.18 (1998): 4004-4015.*

Kääb Andreas. "Monitoring high-mountain terrain deformation from repeated air-and spaceborne optical data: examples using digital aerial imagery and ASTER data." ISPRS Journal of Photogrammetry and remote sensing 57.1 (2002): 39-52.*

* cited by examiner

1 - Stereo image matching succeeded
0 - Stereo image matching failed
2 - Stereo image matching should fail due to underlying terrain
3 - changes of underlying terrain

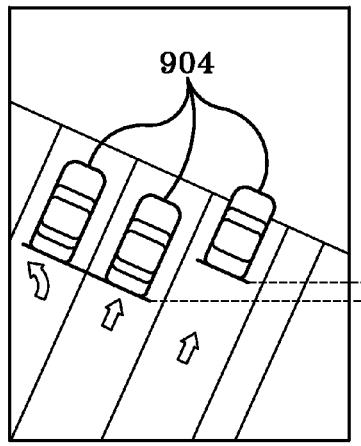
FIG-9A1
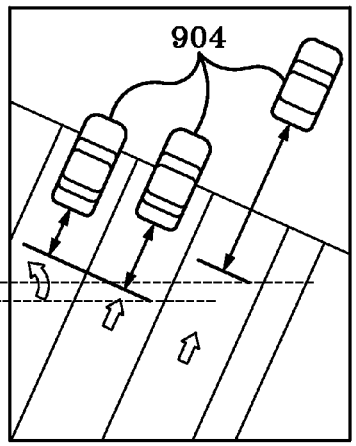
FIG-9B1
Vehicles moved in time interval between image A1 and image B1 as shown.
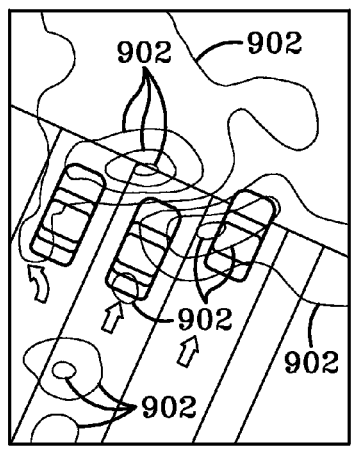
FIG-9A2
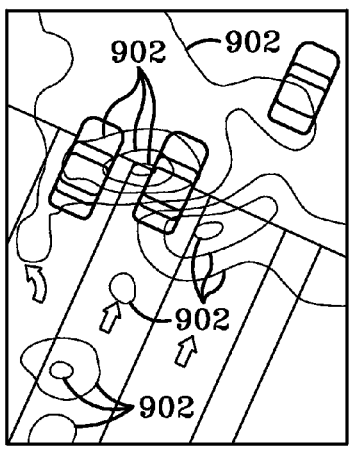
FIG-9B2
Dense contours indicate elevation blunders caused by moving vehicles.
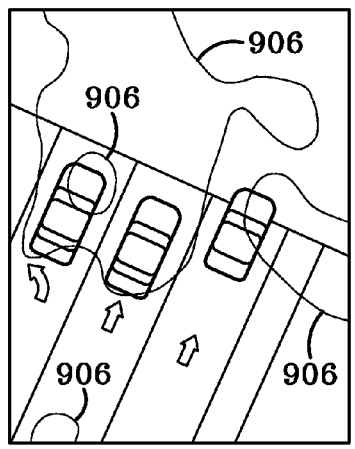
FIG-9A3
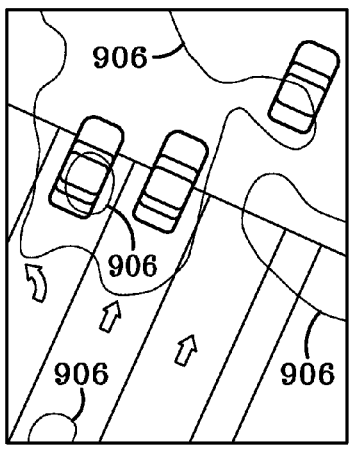
FIG-9B3
Elevation blunders have been automatically detected and removed.

INVERSE STEREO IMAGE MATCHING FOR CHANGE DETECTION

BACKGROUND OF THE INVENTION

1. Field of Invention

The current invention relates generally to apparatus, systems and methods for processing image data. More particularly, the apparatus, systems and methods relate to processing stereo image data. Specifically, the apparatus, systems and methods provide for processing stereo image data (including ad hoc stereo) to detect changes without generating ortho-image data, or constraining image collection to a precisely repeated geometry.

2. Description of Related Art

In a good stereo pair, humans readily fuse the two images and perceive a 3-D scene. The relief may be exaggerated, but our brains are comfortable with the presentation. Similarly, stereo correlation algorithms used for automatic terrain extraction operate nicely on good stereo pairs. But localized differences between stereo image pairs can cause headaches for humans and correlation software alike.

For human observers, these differences confound our natural stereoscopic vision. It is immediately apparent that something isn't right. The differences also confuse image-matching terrain extraction software. The results include spikes, wells and other elevation anomalies that previously required manual editing to correct.

In performing change detection one generally has two choices to eliminate apparent image differences due to collection geometry: 1) constrain the collection to precisely replicate the geometry on subsequent passes, or 2) perform ortho-rectification on images taken at differing geometries. Constraining geometry may not be practical, and our method makes it unnecessary. Ortho-rectification adds time-consuming and expensive steps to the process and deliberately introduces pixel distortions (spatial and spectral) that can produce erroneous change results. We dispense with these steps.

Sometimes ortho-rectification is performed without compensation for topology. Without using a DEM (digital elevation mode, e.g., bare Earth model) in the ortho-rectification process, differential layover distortions persist that will defeat change detection, except in the case of very large pixel sizes (like LANDSAT, MODIS, AVHRR), or very flat terrain. To remove these distortions requires either as many control points as there are pixels (completely untenable!), or true ortho-rectification with a very accurate DEM (which may not exist at suitable resolution).

Any process to re-project an image, whether it compensates for relief or not, is a deliberate distortion of image pixels that fundamentally changes the spatial and spectral character of the image. In change detection, this could result in erroneous results. Epipolar rectification is a fairly minor rotational re-sampling of pixels in the image plane, and does not introduce the large spatial distortions and spectral blending of ortho-rectification.

Ortho-rectification modes include parametric methods and non-parametric methods. The methods applied vary in the quality of resultant ortho-image product. The non-parametric methods generally use 2-dimensional polynomial transformation functions. One of the simplest ways to ortho-rectify an image (and least accurate) is to apply a polynomial function to the surface and adapt the polynomials to a number of ground control points (GCPs). This procedure can only remove the effect of tilt, and can be applied on both satellite images and aerial photographs.

A variety of methods can be used to generate different ortho-rectification models. For example a projective rectification ortho-rectification process can be used to geometrically transform between the image plane and a projective plane. A differential ortho-rectification process can be used to assign gray values from the image (usually an aerial image) to each cell within an ortho-photo. Sensor models are typically classified into two categories: physical and generalized models. The relationship between image and corresponding ground coordinates is established through a physical imaging condition model in the form of collinearity conditions.

Rational function model (RFM) rectification is yet another way to generate ortho-image data. The RFM sensor model describes the geometric relationship between the object space and image space. It relates object point coordinates (X, Y, Z) to image pixel coordinates (r, c) or vice versa using rational polynomial coefficients (RPCs).

Orthorectification algorithms are often performed in conjunction with a re-projection procedure, where rays from the image are re-projected onto a model of the terrain. Fundamentally re-projection can be done in two ways: forward projection (direct projection) and backward projection (indirect method). In the first case of forward projection, the pixels from the original image are projected on top of the DEM of the 3D model and the pixels' object space coordinates are calculated. Then, the object space points are projected into the ortho-image In the case of backward projection, the object space X, Y coordinates related to every pixel of the final ortho-image are determined. The height Z at a specific X, Y point is calculated from the digital elevation model (DEM) or the 3D model and then the X, Y, Z object space coordinates are projected in the original image in order to acquire the gray level value for the ortho-image pixel.

Often, such ortho-rendering processes require many mathematical computations and are very time-consuming. In many cases, those processes require iterative processing that measurably degrades image quality and resolution—especially in cases where thousands of sub-images are being rendered. In cases where the imaging data can be processed automatically, that data is often repetitively transformed and sampled—reducing color fidelity and image sharpness with each successive manipulation. If automated correction or balancing systems are employed, such systems may be susceptible to image anomalies (e.g., unusually bright or dark objects)—leading to over or under-corrections and unreliable interpretations of image data. Therefore, there exists a need for better change detection through stereo image matching.

SUMMARY

The preferred embodiment of the invention is a system for finding real terrain changes between different stereo images. This system is a great improvement over the prior art because it finds the real terrain changes without calculating or using ortho-image data, or severely constraining collection geometry. The system includes rectification logic to perform epipolar rectification on the stereo images to produce epipolar rectified image data without undue spectral or spatial distortion likely in ortho-rectification.

Hybrid stereo matching logic performs image area matching and image edge matching on the epipolar rectified images to produce match data. The digital model generation logic generates a digital model of the first stereo image and the second stereo image based on the match data. In the preferred embodiment, the digital model is a digital surface model (DSM). The detection logic predicts areas in the digital model where stereo image matching should fail due to underlying terrain. The detection logic also finds real terrain changes in the digital model based, at least in part, on areas in the digital model where stereo image matching should fail due to underlying terrain.

In another configuration of the preferred embodiment, the detection logic is configured to partition the digital model into sub-image regions and to, on a sub-image region basis, predict whether one of the sub-image regions should fail matching due to underlying terrain. The detection logic can determine areas in the digital model where stereo image matching should fail due to underlying terrain based, at least in part, on sub-image regions predicted to fail matching.

In an additional configuration of the preferred embodiment, the hybrid stereo matching logic constrains the image edge matching with results from the image area matching. Likewise, the hybrid stereo matching logic can constrain the image area matching with results from the image edge matching. The image area matching and image edge detection can be performed in a hierarchical manner starting from low resolution such as 32:1 to high resolution such as 1:1.

Another configuration of the preferred embodiment is a method for finding real terrain changes in a stereo image pair. The method is performed without calculating ortho-image data. The method includes performing epipolar rectification on a stereo image pair to produce rectified image data. The method performs a hybrid stereo image matching on the rectified image data to produce image matching data. A digital surface model (DSM) is generated based on the image matching data. Next, the method identifies areas in the DSM where the stereo image matching should fail based on the image matching data to generate predicted failures. The method can then determine real terrain changes based on the predicted failures and the image matching data.

In a further configuration of the method, the determining real terrain changes further includes determining whether sub-images of an array of sub-images of the DSM contain real terrain changes. These sub-images of the array of sub-images that contain real terrain changes are grouped to form areas of changes.

Other configuration of the method can perform other useful actions. For example the method may performing blunder correction and inconsistency checking when generating the digital surface model (DSM). The method may generate a topographical map based, at least in part, on the real terrain changes. The generating predicted failures may identify areas in the DSM where stereo image matching should fail based, at least in part, on terrain slope and occlusion.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIGS. 9A1, 9A2, 9A3, 9B1, 9B2 and 9B3 illustrate an application of the preferred embodiment of a system of detecting real terrain changes and producing a more accurate DSM by removing the real terrain changes from the stereo images.

Similar numbers refer to similar parts throughout the drawings.

DETAILED DESCRIPTION

The preferred embodiment of this invention, turns a problem in terrain extraction into an advantage in detecting changes between images. The described systems and methods under this patent application obviates the need carefully constrained collection geometries, or for a pre-existing and highly accurate DEM, and the computationally time-intensive step of true ortho-rectification. It thus dispenses with collection constraints, or alternatively, two expensive process steps in change detection, either of which can introduce errors in change detection.

Figure 1:
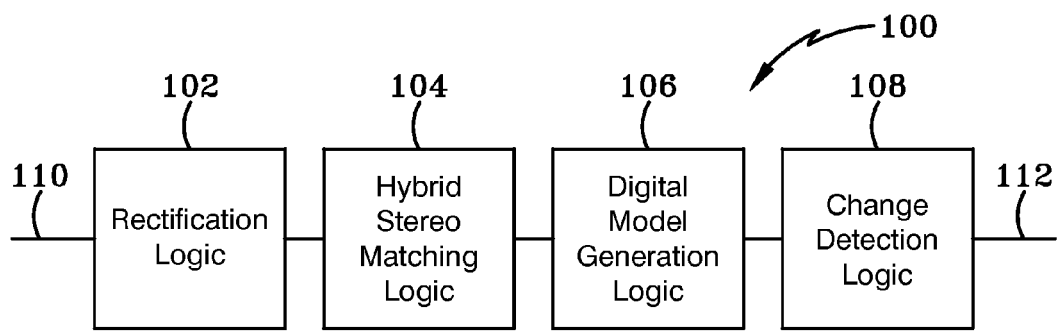
FIG. 1 illustrates a preferred embodiment of a system for detecting real terrain changes between two stereo images.

FIG. 1 illustrates the preferred embodiment of an image processing system 100 that is configured to detect real terrain (e.g., ground) changes between two images that were taken at two different times from two different angles. The image processing system 100 detects ground changes, not image changes. Real terrain changes are underlying terrain between two images. For example, a moving car is in the first stereo image, but is not in the second stereo image is an example of a real terrain change. This is considered a difference of the underlying terrain. A new house is in the second stereo image, but it is not in the first stereo image, this new house is considered a difference in the underlying terrain and is considered a real terrain change. A new highway is in the second stereo image, but it is not in the first stereo image is also a real terrain change. A new highway is considered a real terrain change (difference) in the underlying terrain. A field of new crops is in the first stereo image (taken in the summer or growing season), but it is not in the second stereo image (taken in the winter) is also a real terrain change.

In general, the image processing system 100 does not detect image changes. For example, the shadow of a house in the morning vs. in the afternoon may appear very different in the first stereo image (taken in the morning) from the second stereo image (taken in the afternoon). However, there is no change in the underlying terrain, so this change is considered an image change, not a ground change. The image processing system 100 does not detect these types of changes, or changes that are only in the image space. In this case, there are significant changes in the image space, but there is no change in the ground space (e.g., underlying terrain space).

In general the image processing system 100 operates on stereo image pairs. A stereo image pair is two images that have overlapping footprints and are taken from different angles. The two images can be taken by different sensors and from different time, have different resolutions, and have different bands. The system 100 receives data representing a pair of stereo images at input line 110.

The preferred embodiment of system 100 includes rectification logic 102, hybrid stereo matching logic 104, digital model generation logic 106, change detection logic 108 and an output line 112. The system 100 does not operate on nor generate ortho-image data. Ortho-image data corresponds to ortho-images that use terrain data to determine image displacements that simulate an orthographic view or of the terrain as viewed from infinity. Instead the system uses non-ortho-rectified images that are images that have not gone through an ortho-rectification process.

"Logic", as used herein, includes but is not limited to hardware, firmware, instructions stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include at least one circuit, one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics The rectification logic 102 rectifies both stereo images by performing a piecewise linear approximate epipolar rectification of each image. Epipolar rectification predicts the position of image point p" in the second stereo image when the image point p' is given in the first stereo image. Point p" sits on a straight line in the case of straight-line-preserving camera.

Figure 2:
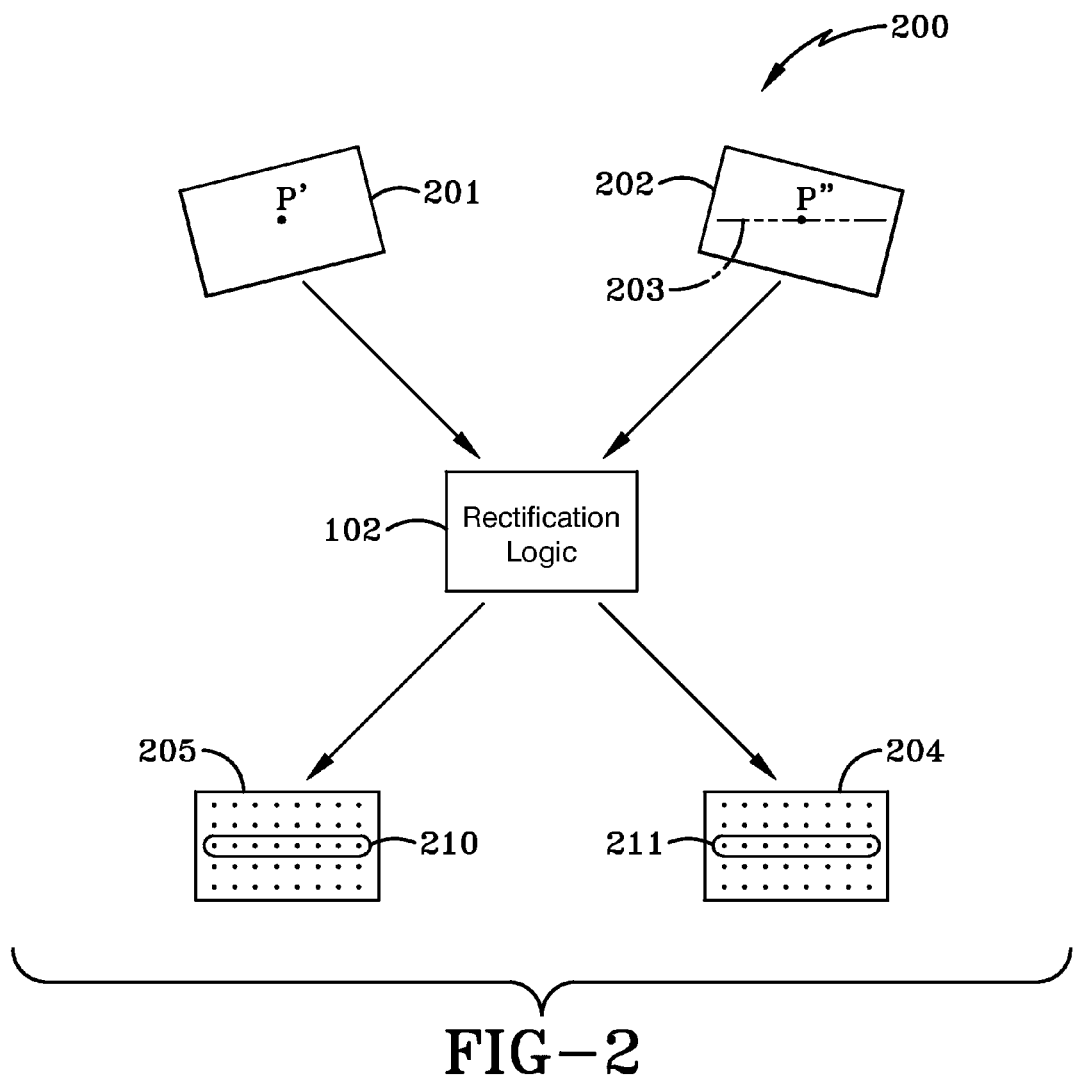
FIG. 2 illustrates a rectification process to rectify stereo images.

For example, the rectification logic 102 can perform a rectification using piecewise approximate epipolar rectification as shown in FIG. 2. FIG. 2 illustrates a pair of stereo image patches 201 and 202 that contain a pair of points P' and P", respectively. Conjugate point P" lies on epipolar line 203. The data of the image patches 201, 202 is input on the input line 110 to the rectification logic 102 of FIG. 1. The rectification logic 102 applies a function such as an affine transformation to rectify the data. The affine transformation may be a 2×2 matrix affine transformation. The transformation converts the stereo image patches 201 and 202 into rectified patches 204 and 205 with lines of pixels 211 in rectified patch 204 that correspond to the same line of pixels 210 in rectified patch 205 with the same resolution.

The hybrid stereo logic 104 operates on rectified stereo image data to perform hybrid stereo image matching. Briefly, hybrid stereo image matching performs image matching (image correlation) and edge matching. In what is an iterative process starting from a low resolution such as 32:1 to high resolution such as 1:1, results from image correlation are used to guide and constrain edge-matching and results from edge-matching are used to guide and constrain image correlation and this process may cycle back and forth a couple of times. The final results are the combined results from both area-matching and edge-matching with blunder detection and inconsistency checking.

Figure 3:
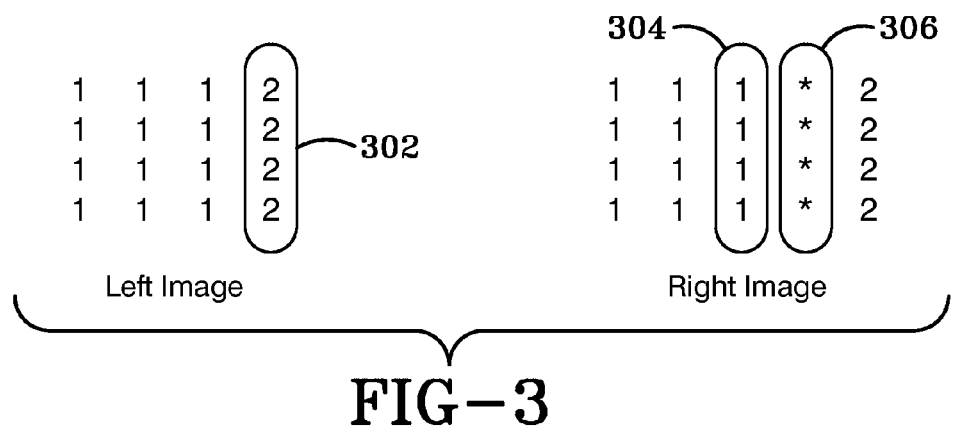
FIG. 3 illustrates area matching of stereo images.

FIG. 3 illustrates an example of hybrid stereo image matching. In this example, the image correlation (area-based image matching) is based on the assumption that elevation or X parallax within a window is the same. Because of elevation differences, pixels labeled as "2" 302 in the left image are not located adjacent to pixels labeled "1" 304 in the right image. Therefore area-based image matching will fail in this case. Edge matching in one configuration of the preferred embodiment, will match edge pixels labeled "1" 304 in FIGS. 3 and 404 in FIG. 4 with the conjugate edge pixels labeled "1" 402 in FIG. 4.

Figure 4:
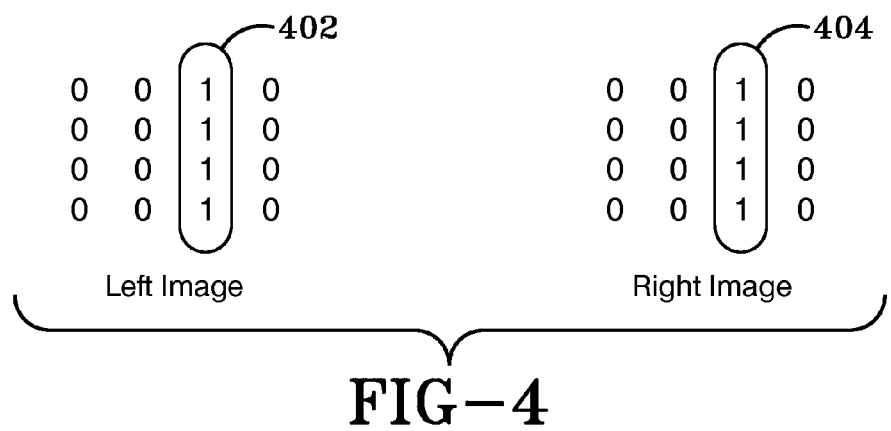
FIG. 4 illustrates edge detection of stereo images.

The hybrid stereo logic 104 of the preferred embodiment can more robustly detect edges for objects such as buildings. Elevation discontinuities such as building edges and the like usually generate image edges. The hybrid stereo logic masks out pixels that are not edge pixels so that edge pixels likely have significant elevation differences. FIG. 4 illustrates an edge detected and represented as pixels of value "1" in the left 402 and right 404 images. Other pixels are masked out and represented with a value of "0". As previously mentioned, the hybrid stereo logic 104 uses an iterative approach to match images and edges. Results from image matching (correlation) are used to guide and constrain edge matching. Results from edge matching are used to guide and constrain image correlation (matching). This process can be repeated from a low resolution such as 32:1 to high resolution such as 1:1. The final results are combined with results from both image correlation and edge matching and can include blunder detection as well as inconsistency checking.

After the hybrid stereo logic 104 has matched images and matched edges, the digital model generation logic 106 can used this data to generate a digital surface model (DSM). The DSM may be generated based on the matched images and matched edges in any way as understood by those of ordinary skill in this art. For example, the DSM may be generated similar to how BAE Systems, Inc's Next Generation Automatic Terrain Extraction (NGATE) tool generates DSMs. As of April, 2011, further information on NGATE can be found here:

http://www.socetqxp.com/docs/education/white papers/wp nqate.pdf

NGATE generates DSMs realizing that the concept is the idea that earlier algorithms were based on the principle that the terrain within the window being matched is level is often incorrect. Actually, elevation differences within a window reduces correlation of that window. Thus NGATE was built with the capability of allowing terrain variation within the window and the window size is related to the elevation difference.

Figure 5:
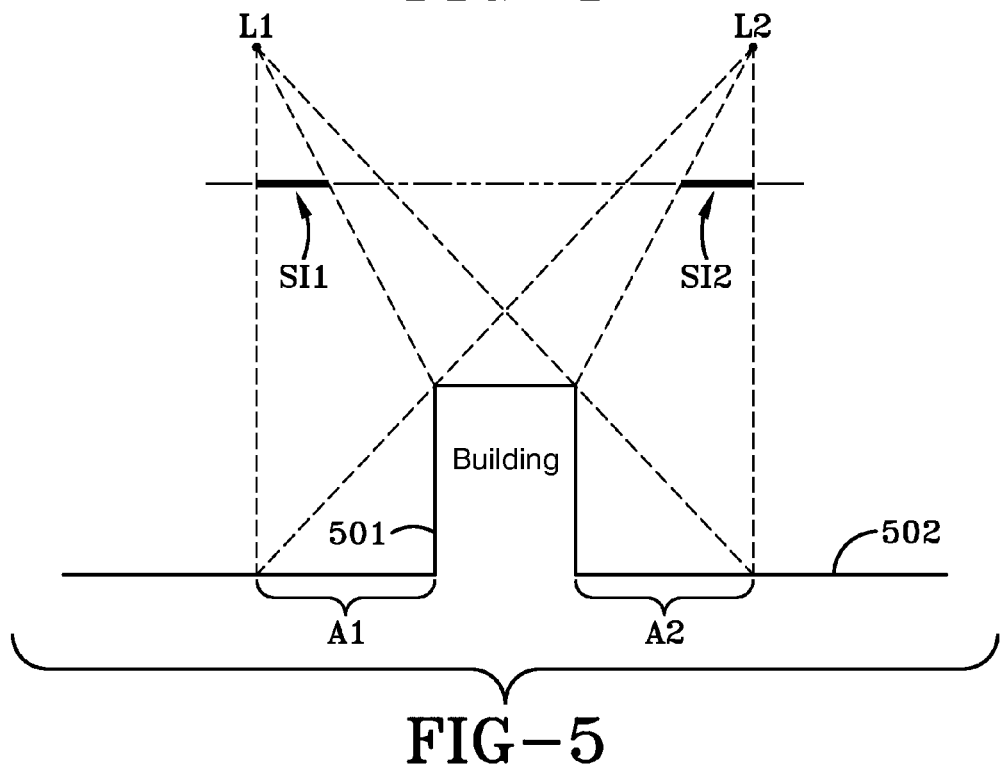
FIG. 5 illustrates areas where stereo image matching is expected to fail due to occlusion of the underlying terrain.

The change detection logic 108 uses the DSM to identify areas where stereo image matching should fail due to the underlying terrain. The stereo image matching can fail due to occlusion and large angle between terrain normal vector and sensor vector. FIG. 5 illustrates an example of occlusion failure. FIG. 5 illustrates two different cameras located at two different locations L1, L2. Each camera takes an image on opposite sides of a building 501 rising about a ground level 502. The first camera at L1 sees area A1 and this area is captured in its stereo image SI1. The second camera at L2 sees area A2 and this area is captured in its stereo image SI2. However, the area A1 is not captured by the image of the second camera at L2 because it is occluded by the building 501 and the area A2 is not captured by the image of the first camera at L1 because it is also occluded by the building 501. In the preferred embodiment, the change detection logic 108 will detect that areas A1 and A2 of FIG. 5 are areas where image matching should fail due to occlusions.

Additionally, the change detection logic 108 can use other algorithms for determining if a ground point should fail due to large angle between terrain normal vector and sensor vector. A digital surface model (DSM) can be described as equation 1:

$$z = f(x, y) \quad (1)$$

At ground point a(x y z), the terrain normal vector can be computed as in equation 2:

$$n_t = \begin{vmatrix} \partial f / \partial x \\ \partial f / \partial y \\ 1 \end{vmatrix} \quad (2)$$

At ground point a(x y z), the sensor vector from a(x y z) to sensor S(X Y Z) is computed as in equation 3:

$$n_z = \begin{vmatrix} X - x \\ Y - y \\ Z - z \end{vmatrix} \quad (3)$$

The angle between these two vectors is computed as in equation 4:

$$\alpha = \cos^{-1}(n_t \cdot n_s / (|n_t||n_s|)) * (180/\pi) \quad (4)$$

For each pair of stereo images that cover point a(x y z) the change detection logic 108 can compute angles for both images using equation (4), if at least one angle is $>\alpha_t$, (where, $\alpha_t$ is a threshold between 60 to 90 degrees), this image pair should fail at ground point a(x y z).

After the change detection logic 108 determines areas that should fail due to the underlying terrain, it can then begin to determine areas of terrain that have changed and that are real terrain changes. Real terrain changes include such things as the repositioning of a vehicle due to that vehicle being driven, the construction of a new building appearing in a second image that was taken after a first image, where the first image was taken before the building was erected.

Figures 6, 7, 8:
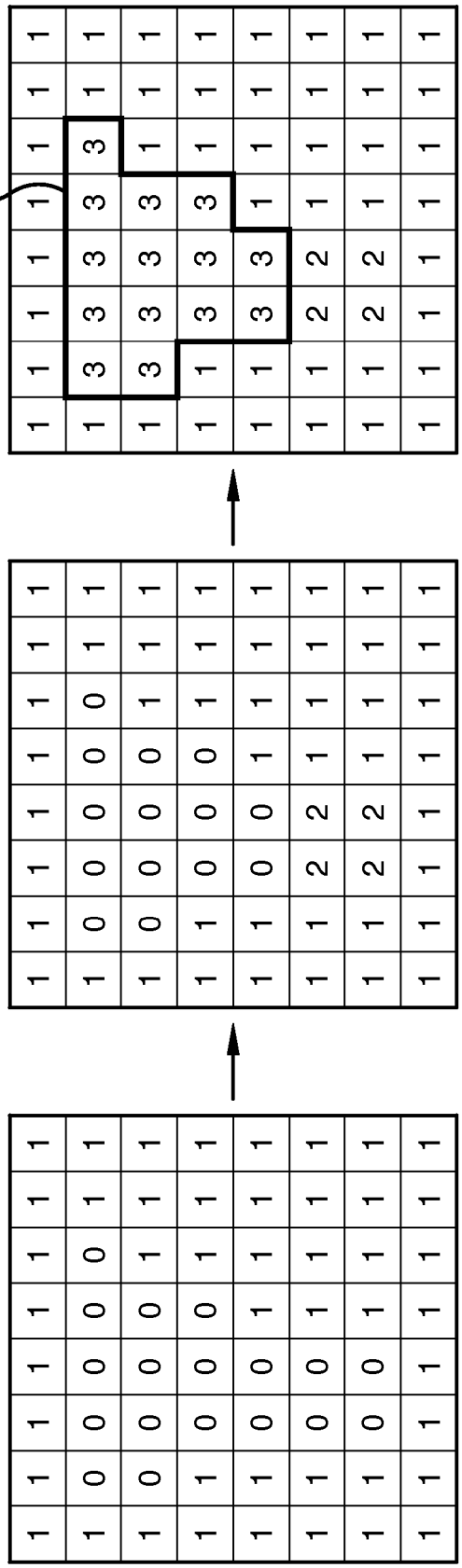
FIGS. 6-8 illustrate portions of a process for finding real terrain changes based on areas of successful stereo matching, unsuccessful stereo image matching and predicted stereo image matching failures.

In one configuration of the preferred embodiment, the change detection logic 108 can map regions of an image into a ground space grid as shown in FIG. 6. In that figure areas of a stereo image that have been stereo image matched by the hybrid stereo matching logic 104 discussed above are labeled with a "1" and those that have failed are labeled "0". Each sub-square illustrated in FIGS. 6 through 8 represents an area of ground. For example, the area represented may be about five meters by about five meters. The change detection logic 108 can also generate the grid shown in FIG. 7 that now includes regions of the image that were predicted to fail due to the underlying terrain. The remaining failures are then predicted by the change detection logic 108 to be real terrain changes. The change detection logic 108 can then group real terrain changes into regions and to trace a boundary 802 of the regions as illustrated by FIG. 8. To group area of real terrain changes into regions the change detection logic 408 can execute the following pseudo code:

while there are still "0" in FIG. 7 that have not been grouped into a region:
    select one such "0" and assign it into a new region;
    loop through the entire dataset and for each "0" of this new region;
        check its 4 neighbors and add the ones that are "0" to this region;
    repeat until there are no more connected "0" for this region;

The change detection logic 108 can use any common algorithm, as understood by those of ordinary skill in the art, to trace the boundary 802 of each region denoting a real terrain change.

FIGS. 9A1, 9A2, 9A3, 9B1, 9B2 and 9B3 illustrate actual data generated by a configuration of the preferred embodiment of the image processing system 100 configured as BAE Systems NGATE system discussed earlier. FIGS. 9A1 and 9B2 illustrate a pair of stereo images showing movement of cars at a toll plaza. FIGS. 9A2 and 9B2 illustrate how the contour lines 902 of the terrain in the figures may traditionally be inaccurately generated due to the real terrain changes (moved cars 904). FIGS. 9A3 and 9B3 illustrate how NGATE is able to successfully detect the real terrain changes and to accurate draw the elevation contours 906 when accounting for the real terrain changes.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 10:
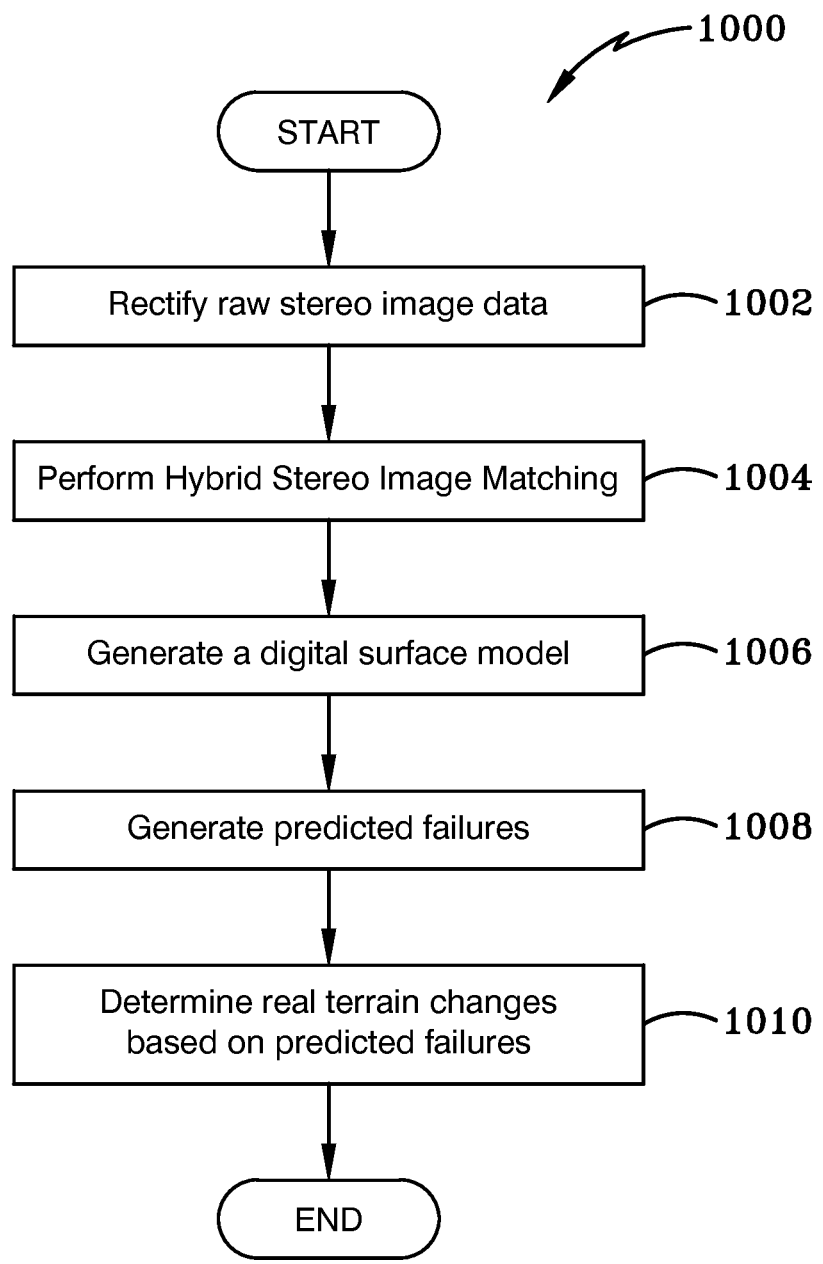
FIG. 10 illustrates an embodiment of a method for detecting real terrain changes between two stereo images.

FIG. 10 illustrates a method 1000 of finding differences of underlying terrain between two stereo images. The method finds the real terrain changes without using or needed to calculate any ortho-image data. The method 1000 begins by rectifying raw stereo image data, at 1002. For example the method 1000 can rectify the data by performing epipolar rectification the stereo image to produce rectified image data.

Hybrid stereo image matching is performed on the rectified image data, at 1004, to produce image matching data. Both image area matching and edge matching are performed. Results from the image area matching may constrain the edge matching and results from the edge matching may constrain the area matching. The area matching and edge matching can be performed in series alternating between the two.

A digital surface model (DSM) is generated, at 1006. The DSM is based, at least in part, on the image matching data. The method, at 1008, then generates predicted failures. The predicted failures are generated by identifying areas in the DSM where stereo image matching should fail based, at least in part, on the image matching data and the DSM. Real terrain changes are determined, at 1010, based, at least in part, on the predicted failures and the image matching data as described earlier.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method for finding differences of underlying terrain between a first stereo image and a second stereo image comprising:
   performing an epipolar rectification on at least one of the first stereo image and the second stereo image to produce rectified image data;
   performing stereo image matching on the rectified image data to produce image matching data;
   generating a digital surface model (DSM) based, at least in part, on the image matching data;
   identifying areas in the DSM where stereo image matching fails based, at least in part, on the image matching data and the DSM;
   among the areas in the DSM where stereo image matching fails, identifying predicted occlusion failure areas in which the stereo image matching should fail due to occlusions, wherein the predicted occlusion failure areas do not include real terrain changes;
   identifying remaining areas among the areas in the DSM where stereo image matching fails as unpredicted failure areas that include real terrain changes, wherein real terrain changes include at least one of the group of: a first three-dimensional object moving between two different stereo images, a second three-dimensional object appearing in the second stereo image and not in the first stereo image, and a third three-dimensional object appearing in the first stereo image and not in the second stereo image;
   separating the predicted occlusion failure areas from the unpredicted failure areas to determine the real terrain changes; and
   generating a new image based on the real terrain changes, wherein at least some of the real terrain changes are eliminated from the new image, and wherein the method is performed without performing ortho-rectification on the first and second stereo images.

2. The method of claim 1 wherein the method does not use ortho-image data.

3. The method of claim 1 wherein the performing the stereo image matching further comprises:
   performing a hybrid stereo image matching with image matching and edge matching.

4. The method of claim 3 wherein the performing the hybrid stereo image matching further comprises:
   performing one or more from the group of:
   using results from the image matching to constrain the edge matching; and
   using results from the edge matching to constrain the image matching.

5. The method of claim 1 wherein the image matching data contains information about detected edges and matched images.

6. The method of claim 1 wherein the determining real terrain changes further comprises:
   determining whether sub-image regions of the DSM contain real terrain changes; and
   grouping sub-image regions that contain real terrain changes to form areas of changes.

7. The method of claim 1 wherein the performing epipolar rectification further comprises:
   performing piecewise approximate epipolar rectifications.

8. The method of claim 1 wherein the performing epipolar rectification further comprises:
   applying an affine transformation on at least one of the first stereo image and the second stereo image to produce the rectified image data.

9. The method of claim 8 wherein the affine transformation is based on a 2×2 matrix.

10. The method of claim 1 wherein the performing a hybrid stereo image matching further comprises:
    performing blunder correction and inconsistency checking.

11. The method of claim 1 further comprising:
    generating a topographical map based, at least in part, on the real terrain changes.

12. The method of claim 1 wherein the identifying predicted occlusion failure areas further comprises:
    identifying areas in the DSM where stereo image matching should fail based, at least in part, on occlusion and large angles between terrain normal vector and sensor vector.

13. A system for finding real terrain changes between a first stereo image and a second stereo image comprising:
    a rectification processor to perform rectification on the first stereo image and the second stereo image to produce epipolar rectified image data;
    a stereo matching processor to perform image area matching and image edge matching on the epipolar rectified data to produce match data;
    a digital model generation processor to generate a digital model of the first stereo image and the second stereo image based on the match data; and
    a detection processor to:
      identify areas in the digital model where stereo image matching fails,
      among the areas in the DSM where stereo image matching fails, identify predicted occlusion failure areas in which the stereo image matching should fail due to occlusions, wherein the predicted occlusion failure areas do not include real terrain changes,
      identify remaining areas among the areas in the DSM where stereo image matching fails as unpredicted failure areas that include real terrain changes, wherein real terrain changes include at least one of the group of: a first three-dimensional object moving between two different stereo images a second three-dimensional object appearing in the second stereo image and not in the first stereo image, and a third three-dimensional object appearing in the first stereo image and not in the second stereo image, and
      separate the predicted occlusion failure areas from the unpredicted failure areas to determine the real terrain changes based, at least in part, on the predicted failures and the image matching data;
    and an image generation processor configured to generate a new image based on the real terrain changes wherein at least some of the real terrain changes are eliminated from the new image, and wherein the system does not perform ortho-rectification on the first and second stereo images.

14. The system for finding real terrain changes of claim 13 wherein the system finds the real terrain changes without calculating or using ortho-image data.

15. The system for finding real terrain changes of claim 13 wherein the detection is configured to partition the digital model into sub-image regions and to, on a sub-image region basis, predict whether one of the sub-image regions should fail matching due to underlying terrain.

16. The system for finding real terrain changes of claim 15 wherein detection processor is configured to determine areas in the digital model where stereo image matching should fail due to underlying terrain based, at least in part, on sub-image regions predicted to fail matching.

17. The system for finding real terrain changes of claim 13 wherein the rectification processor is configured perform an epipolar rectification by apply an affine transformation.

18. The system for finding real terrain changes of claim 13 wherein the stereo matching processor is configured to constrain the image edge matching with results from the image area matching, and wherein the stereo matching processor is configured to constrain the image area matching with results from the image edge matching.

19. The system for finding real terrain changes of claim 13 wherein the stereo matching processor is configured to perform the image area matching and image edge matching alternately.

20. The system for finding real terrain changes of claim 13 wherein the digital model is a digital surface model (DSM).

* * * * *